(12) United States Patent
Chung

(10) Patent No.: US 11,068,123 B2
(45) Date of Patent: *Jul. 20, 2021

(54) SYSTEMS AND METHODS FOR PRESENTING USER INTERACTION INFORMATION

(71) Applicant: Facebook, Inc., Menlo Park, CA (US)

(72) Inventor: Andrew Michael Chung, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,129

(22) Filed: Apr. 26, 2019

(65) Prior Publication Data

US 2019/0250794 A1    Aug. 15, 2019

Related U.S. Application Data

(63) Continuation of application No. 15/246,799, filed on Aug. 25, 2016, now Pat. No. 10,318,107.

(51) Int. Cl.
| | |
|---|---|
| *G06F 3/14* | (2006.01) |
| *G06F 3/0481* | (2013.01) |
| *G06Q 50/00* | (2012.01) |
| *G06Q 10/10* | (2012.01) |

(52) U.S. Cl.
CPC ....... *G06F 3/04817* (2013.01); *G06Q 10/107* (2013.01); *G06Q 50/01* (2013.01)

(58) Field of Classification Search
CPC ........................................ G06F 3/14
USPC .......... 715/753; 705/14.66; 709/204
See application file for complete search history.

(56) References Cited

U.S. PATENT DOCUMENTS

| | | | |
|---|---|---|---|
| 2014/0279038 A1* | 9/2014 | Lombard | G06Q 50/01 705/14.66 |
| 2016/0021179 A1* | 1/2016 | James | G06Q 10/10 709/204 |
| 2016/0358125 A1* | 12/2016 | Bastide | G06Q 10/1095 |
| 2017/0039867 A1* | 2/2017 | Fieldman | G11B 27/031 |
| 2017/0345105 A1 | 11/2017 | Isaacson | |
| 2018/0032997 A1 | 2/2018 | Gordon | |

* cited by examiner

*Primary Examiner* — Ruay Ho
(74) *Attorney, Agent, or Firm* — Sheppard Mullin Richter & Hampton LLP

(57) ABSTRACT

Systems, methods, and non-transitory computer-readable media can receive a set of information presentation rules, and receive a user interaction with a social network content post. User interaction information is displayed on a user interface for a current user based on the user interaction and the set of information presentation rules.

20 Claims, 10 Drawing Sheets

230

250

600

```
┌─────────────────────────────────────────────────────────────────────────────┐
│ Receive a set of information presentation rules, including a set of         │
│ information arrangement rules and a set of information content rules        │
│                                    602                                       │
└─────────────────────────────────────────────────────────────────────────────┘
                                      │
                                      ▼
┌─────────────────────────────────────────────────────────────────────────────┐
│ Receive a plurality of reactions to a social network content post, each of  │
│ the plurality of reactions associated with a particular reaction icon       │
│ selected from a predefined plurality of reaction icons                      │
│                                    604                                       │
└─────────────────────────────────────────────────────────────────────────────┘
                                      │
                                      ▼
┌─────────────────────────────────────────────────────────────────────────────┐
│ Rank the plurality of reaction icons based on reaction icon ranking         │
│ criteria, the ranking criteria defined by the set of information content    │
│ rules                                                                        │
│                                    606                                       │
└─────────────────────────────────────────────────────────────────────────────┘
                                      │
                                      ▼
┌─────────────────────────────────────────────────────────────────────────────┐
│ Select one or more reaction icons for presentation based on the ranking     │
│ the plurality of reaction icons                                             │
│                                    608                                       │
└─────────────────────────────────────────────────────────────────────────────┘
                                      │
                                      ▼
┌─────────────────────────────────────────────────────────────────────────────┐
│ Determine an order of presentation for the one or more reaction icons       │
│ based on the set of information arrangement rules                           │
│                                    610                                       │
└─────────────────────────────────────────────────────────────────────────────┘
                                      │
                                      ▼
┌─────────────────────────────────────────────────────────────────────────────┐
│ Generate a social sentence based on the set of information content rules    │
│ and the plurality of reactions                                              │
│                                    612                                       │
└─────────────────────────────────────────────────────────────────────────────┘
```

FIGURE 6

SYSTEMS AND METHODS FOR PRESENTING USER INTERACTION INFORMATION

CROSS-REFERENCE TO RELATED APPLICATIONS

This application is a continuation of U.S. patent application Ser. No. 15/246,799, filed on Aug. 25, 2016 and entitled "SYSTEMS AND METHODS FOR PRESENTING USER INTERACTION INFORMATION", which is incorporated herein by reference in its entirety.

FIELD OF THE INVENTION

The present technology relates to social networking systems. More particularly, the present technology relates to presenting user interaction information.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users of a social networking system can be provided with a user interface to interact with content posted by other users on a social networking system, i.e., social network content posts. For example, users can comment on, react to, and/or share social network content posts posted to the social networking system by other users. Participation in the social networking system by users can be encouraged and promoted by improving tools, features, and interfaces to facilitate interaction on the social networking system.

SUMMARY

Various embodiments of the present disclosure can include systems, methods, and non-transitory computer readable media configured to receive a set of information presentation rules, and receive a user interaction with a social network content post. User interaction information is displayed on a user interface for a current user based on the user interaction and the set of information presentation rules.

In an embodiment, a plurality of user interactions to the social network content post is received. Each of the plurality of user interactions comprises a selection of a reaction icon from a plurality of predefined reaction icons. A subset of the plurality of predefined reaction icons is selected for presentation on the user interface.

In an embodiment, the subset of the plurality of predefined reaction icons is displayed on the user interface in order of popularity.

In an embodiment, a plurality of user interactions to a social network content post is received from a set of reacting users. Each of the plurality of user interactions comprises a selection of a reaction icon from a plurality of predefined reaction icons. A social sentence is generated based on the plurality of user interactions.

In an embodiment, a determination is made that the set of reacting users does not include any connections of the current user on the social networking system. The social sentence is generated based on the determination that the set of reacting users does not include any connections of the current user on the social networking system.

In an embodiment, the social sentence is indicative of a total number of users in the set of reacting users.

In an embodiment, the set of information presentation rules defines a maximum number of connection names capable of being displayed. A set of connected users is determined from the set of reacting users. The set of connected users comprises a plurality of users, each user in the set of connected users being a connection of the current user on a social networking system. A determination is made that the number of users in the set of connected users is greater than the maximum number of connection names capable of being displayed. The set of connected users is ranked based on user ranking criteria. A subset of the set of connected users is selected based on the ranking.

In an embodiment, the set of connected users is ranked based on a friendship coefficient.

In an embodiment, the social sentence identifies the subset of the set of connected users.

In an embodiment, a user interaction is received to the social network content post from the current user. The social sentence is updated to indicate that a user interaction has been received from the current user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 6 illustrates an example method associated with presenting user reaction information, according to an embodiment of the present disclosure.

Figure 1:
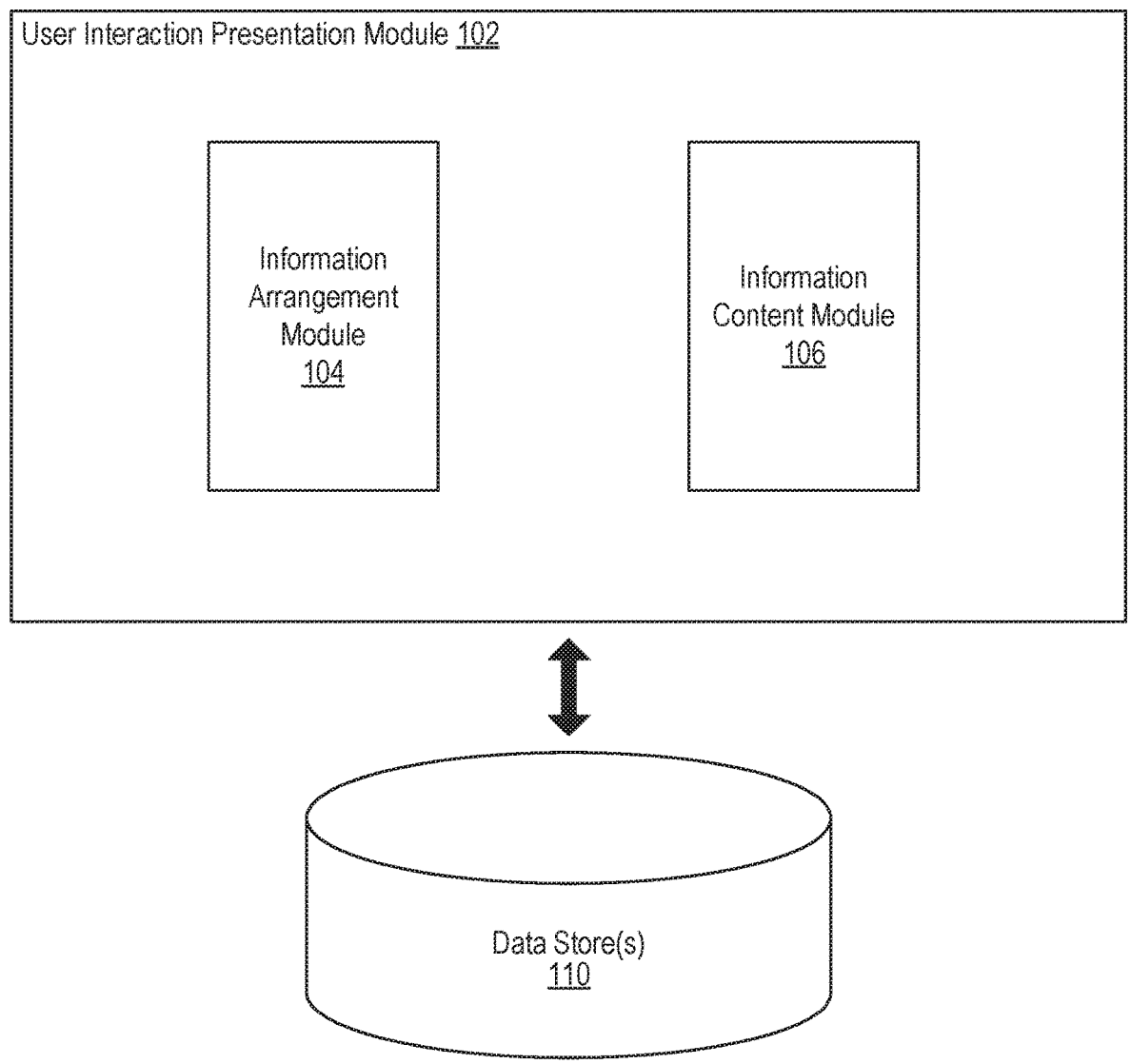
FIG. 1 illustrates an example system including a user interaction presentation module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Presentation of User Interaction Information

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users of a social networking system can be provided with a user interface to interact with content posted by other users on the social networking system, i.e., social network content posts. For example, users can comment on, react to, and/or share social network content posts posted to the social networking system by other users. Participation in the social networking system by users can be encouraged and promoted by improving tools, features, and interfaces to facilitate interaction with content posts on the social networking system.

It continues to be an important interest for a social networking system to improve the experience of users interacting with content posts on the social networking system. Continued user interaction with content posted on the social networking is an important aspect of maintaining continued interest in and participation on the social networking system. A social networking system can provide users with an interface to interact with content posts on the social networking system. For example, the interface can provide users with the ability to react to a content post (e.g., to "like" the content post or provide an alternative reaction), comment on a content post, and/or share a content post. Users can also be provided with user interaction information indicative of other users' interactions with a particular content post. Knowledge of other users' interactions with a particular content post may encourage a user to interact with the content post. However, it can be difficult to provide users with user interaction information that is interesting and relevant to them. It can also be difficult to present user interaction information in a way that is appealing, and will encourage users to interact based on other users' interactions.

An improved approach rooted in computer technology overcomes the foregoing and other disadvantages associated with conventional approaches specifically arising in the realm of computer technology. Based on computer technology, the disclosed technology can present user interaction information for a social network content post based on a set of information presentation rules. In certain embodiments, the information presentation rules can include information arrangement rules for defining how various elements in an interface should be arranged, and information content rules for determining what user interaction information should be presented. In various embodiments, a social network content post can be presented with associated user interaction information. The user interaction information can be presented in a user interaction information area, or user interaction information bar. The user interaction information for a particular social network content post can be updated based on user interaction with the social network content post. In certain embodiments, the user interaction information can include one or more reaction icons indicative of how one or more users have reacted to the associated social network content post. In various embodiments, the user interaction information can also include a "social sentence," which may be a textual representation of users' reactions to the social network content post. The set of information presentation rules can define the content and arrangement of the reaction icons and/or the social sentence. These concepts will be described in greater detail below with reference to the figures.

FIG. 1 illustrates an example system 100 including an example user interaction presentation module 102 configured to present user interaction information, according to an embodiment of the present disclosure. The user interaction presentation module 102 can be configured to apply a set of information presentation rules to present user interaction information for a social network content post. The user interaction information can be presented through a user interface displayed on a computing device associated with a user. The user interface can be presented by an application provided by a social networking system. In certain embodiments, the information presentation rules can include information arrangement rules for defining how various elements in an interface should be arranged, and information content rules for defining what user interaction information should be presented. In various embodiments, user interaction information can include one or more reaction icons indicative of users' interactions with the social network content post. The set of information presentation rules can provide rules specifying the arrangement and content of the one or more reaction icons. The user interaction information can also include a social sentence providing a textual representation of users' interactions with the social network content post. The set of information presentation rules can provide rules specifying the arrangement and content of the social sentence.

As shown in the example of FIG. 1, the user interaction presentation module 102 can include an information arrangement module 104 and an information content module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The information arrangement module 104 can be configured to implement a set of information arrangement rules, which specify how user interaction information is arranged, positioned, and/or presented in a user interface. In certain embodiments, a user interface for a social networking system can present a social network content post. The social network content post can be presented along with associated user interaction information, which is indicative of how users have interacted with the social network content post. User interaction information can be presented in a user interaction information area, or user interaction information bar. The user interface can also include a user interaction area, which allows a current user to interact with the social network content post. The information arrangement module 104 can implement the set of information arrangement rules to define how information is presented in the user interaction information area and/or the user interaction area. For example, the set of information arrangement rules can define the alignment and/or positioning of particular user interaction information, and the order in which user interaction information is presented. The information arrangement module 104 is discussed in greater detail herein with reference to an exemplary set of information arrangement rules presented in FIGS. 2A-D.

The information content module 106 can be configured to implement a set of information content rules for determining user interaction information to be presented to a user. In certain embodiments, user interaction information can include one or more reaction icons. The information content module 106 can be configured to select one or more reaction icons to be presented. In certain embodiments, user interaction information can include a social sentence providing a textual representation of user reactions to a social network content post. The information content module 106 can be configured to generate the social sentence based on the set of information content rules. The information content module 106 is described in greater detail herein.

The user interaction presentation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the user interaction presentation module 102 can be implemented, in part or in whole, as software running on one or more computing devices or systems, such as on a server computing system or a user (or client) computing system. For example, the user interaction presentation module 102 or at least a portion thereof can be implemented as or within an application (e.g., app), a program, or an applet, etc., running on a user computing device or a client computing system, such as the user device 710 of FIG. 7. In another example, the user interaction presentation module 102 or at least a portion thereof can be implemented using one or more computing devices or systems that include one or more servers, such as network servers or cloud servers. In some instances, the user interaction presentation module 102 can, in part or in whole, be implemented within or configured to operate in conjunction with a social networking system (or service), such as the social networking system 730 of FIG. 7. It should be understood that there can be many variations or other possibilities.

The user interaction presentation module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 730 of FIG. 7). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the user interaction presentation module 102. For example, the data store 110 can store user interaction information, one or more information presentation rules, one or more information arrangement rules, one or more information content rules, and the like. It is contemplated that there can be many variations or other possibilities.

FIGS. 2A-D present example user interface elements that may be generated as a result of implementing a set of information presentation rules, according to embodiments of the present disclosure. The information presentation rules can include a set of information arrangement rules. In certain embodiments, certain individual elements within a user interface may be positioned and/or arranged based on implementation of the set of information arrangement rules by the information arrangement module 104 of FIG. 1.

Figure 2A:
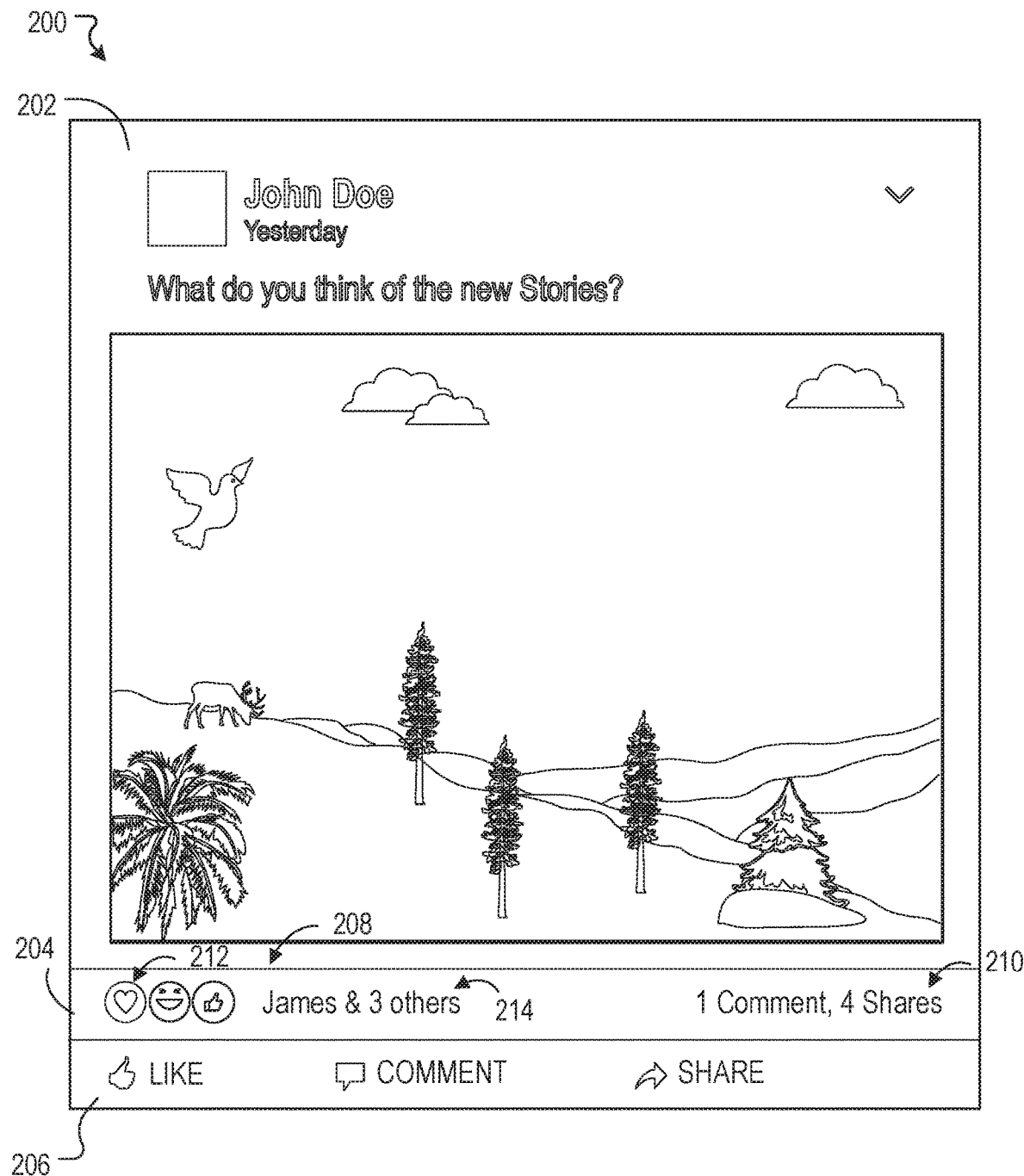
FIG. 2A illustrates an example scenario including an example social network content post user interface, according to an embodiment of the present disclosure.

FIG. 2A presents an example scenario 200 displayed in a user interface, including a social network content post 202. The social network content post 202 is presented with an associated user interaction information area 204 and a user interaction area 206. The user interaction information area 204 presents user interaction information, while the user interaction area 206 allows a user to interact with the social network content post 202. In one embodiment, the user interaction information area 204 and the user interaction area 206 can be selected heights with various icons therein being selected heights with a border having selected dimensions. In some embodiments, the selected heights and selected dimensions can be measured in pixels. For example, in one implementation, the user interaction information area 204 is approximately 34 pixels in height, with the reaction icons 212 being approximately 16 pixels in height and a 9 pixel border above and below the reaction icons 212. In one embodiment, the user interaction area 206 is approximately 32 pixels in height, with various user interaction icons (e.g., Like, Comment, Share) being approximately 14 pixels in height with a 9 pixel border above and below the user interaction icons.

The user interaction information area 204 can include user reaction information 208. The reaction information 208 can include one or more reaction icons 212, and a social sentence 214. The one or more reaction icons 212 and the social sentence 214 are indicative of users' reactions to the social network content post 202. For example, in the example scenario 200, the reaction icons 212 include a heart icon (i.e., a "love" reaction icon), a laughing face icon (i.e., a "haha" reaction icon), and a thumbs up icon (i.e., a "like" reaction icon), indicating that one or more users have selected these reactions in response to the social network content post 202. In the example scenario 200, the social sentence 214 also states that "James & 3 others" have reacted to the social network content post 202. In certain embodiments, where a plurality of reaction icons have been selected by users, as is the case in example scenario 200, one or more information arrangement rules may specify an order of presentation for the plurality of reaction icons. For example, reaction icons may be presented in order of popularity. In the example shown in FIG. 2A, the love reaction icon is presented first, from left to right, because it is the most popular reaction (i.e., the most users have selected this reaction in response to the social network content post 202). The haha reaction icon is the second most popular, and the like reaction icon is the third most popular reaction.

Figure 2B:
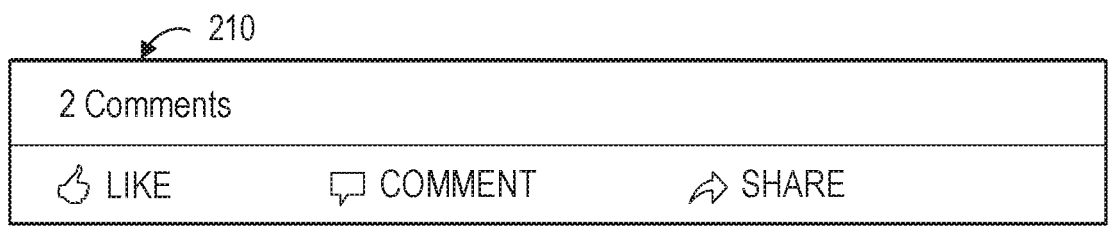
FIG. 2B illustrates an example scenario including an example user interaction information presentation interface, according to an embodiment of the present disclosure.

In addition to the reaction information 208, the user interaction information area 204 can also present other interaction information 210. This other interaction information 210 may include information such as the number of comments to the social network content post 202, the number of times the social network content post 202 has been shared, and/or the number of times the social network content post 202 has been viewed. Information arrangement rules can specify the positioning of the reaction information 208 and other interaction information 210 within the user interaction information area 204. In certain embodiments, the reaction information 208 and/or the other interaction information can appear in various selected positions depending on available interaction information. For example, FIG. 2B shows an example scenario 230 displayed in a user interface in which two users have commented on a social network content post, but no users have provide a reaction to the social network content post (e.g., by selecting a reaction icon from a set of reaction icons). In this circumstance, the set of information arrangement rules may dictate that the other interaction information 210 (i.e., the fact that there are two comments), is left-aligned within the user interaction information are 204.

Figure 2C:
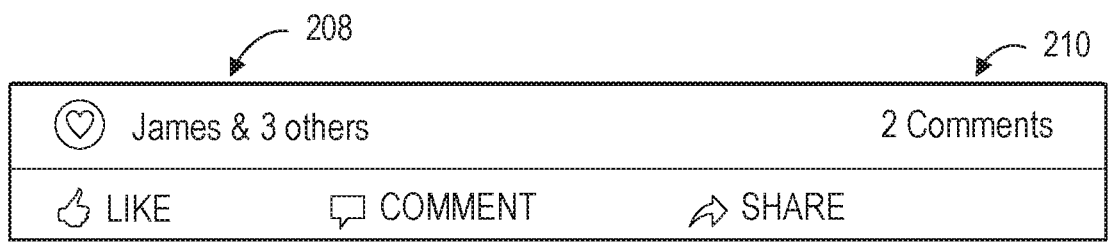
FIG. 2C illustrates an example scenario including an example user interaction information presentation interface, according to an embodiment of the present disclosure.

FIG. 2C shows an example scenario 250 displayed in a user interface in which two users have commented on the social network content post, but four users have also reacted to the social network content post. In this circumstance, the set of information arrangement rules may dictate that the reaction information 208 is left-aligned, and other interaction information 210 is right-aligned, as shown in the example scenario 250. In certain embodiments, if reaction information is available, reaction information is left-aligned. Other interaction information is only left-aligned when there is no reaction information available. Otherwise, the other interaction information is right-aligned.

Figure 2D:
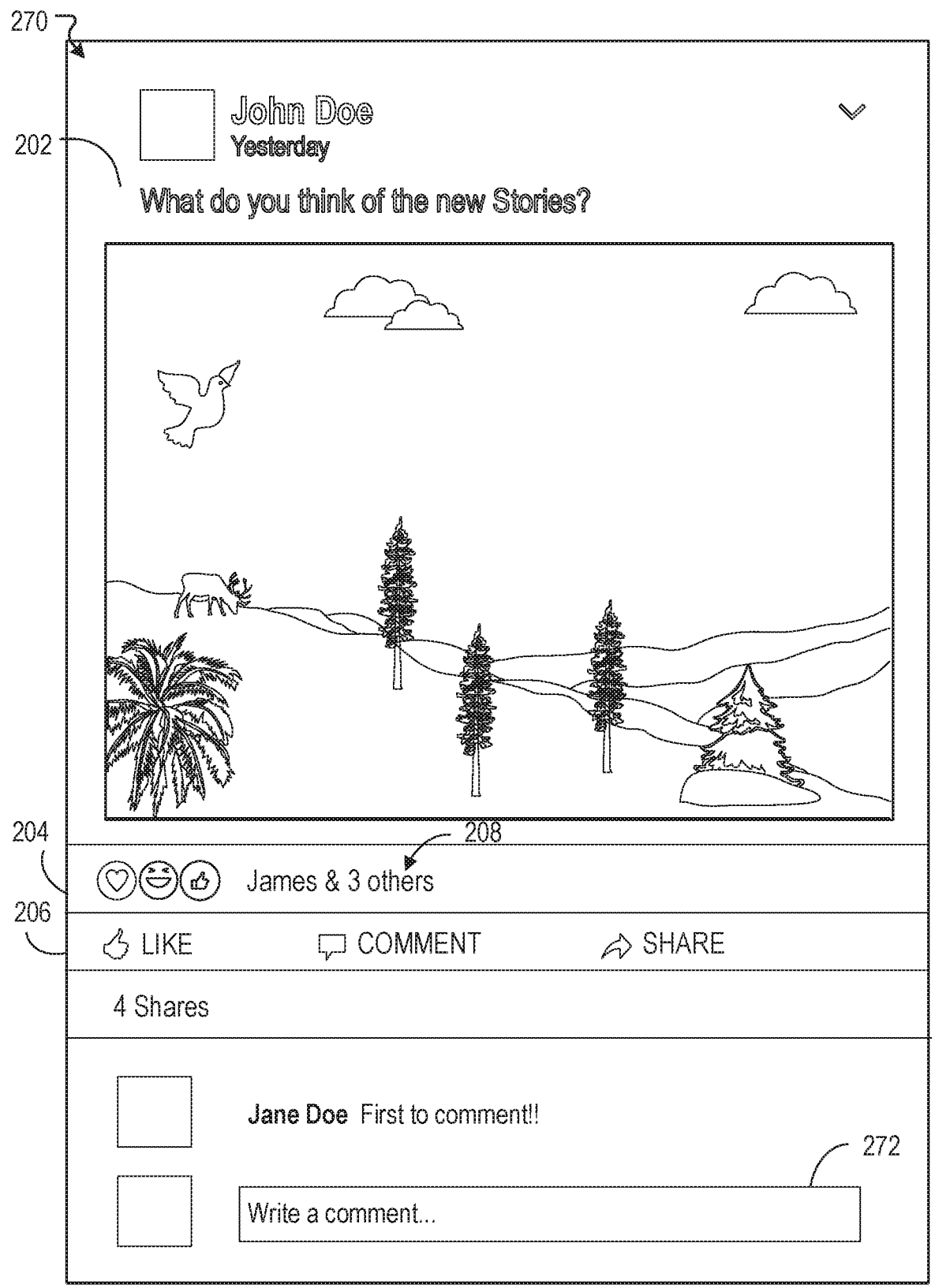
FIG. 2D illustrates an example scenario including an example expanded social network content post user interface, according to an embodiment of the present disclosure.

In certain embodiments, information arrangement rules may differ based on a state of a social network content post. For example, a social network content post may be presented to a user (e.g., in the user's social networking system news feed) in an expanded state or in a collapsed state. FIG. 2D shows an example scenario 270 displayed in a user interface in which a social network content post 202 is presented in an expanded state. FIG. 2D can be contrasted to FIG. 2A, in which the social network content post 202 is presented in a collapsed state. In the expanded state of FIG. 2D, one or more comments are presented below the social network content post 202, along with a comment bar 272 for a current user to enter a comment. In the collapsed state of FIG. 2A, comments are not presented below the social network content post 202. It can be seen that there is more room in the expanded state of FIG. 2D for presenting user interaction information compared to the collapsed state of FIG. 2A. As such, it may not be necessary to include both reaction information 208 and other interaction information 210 in a single user interaction information area 204, since there is more space to present such information. Therefore, information arrangement rules may differ for a social network content post based on whether the social network content post is presented in a collapsed state or an expanded state. For example, in a collapsed state where reaction information and other interaction information are presented in a single line, as was the case in FIGS. 2A-2C, information arrangement rules may include one or more rules that specify that other interaction information is left-aligned when there is no reaction information available, and is right-aligned when there is reaction information available (as discussed above with reference to FIGS. 2B-C). However, in an expanded state, in which reaction information and other interaction information are presented in separate lines or areas, these rules may not be necessary.

Figure 3:
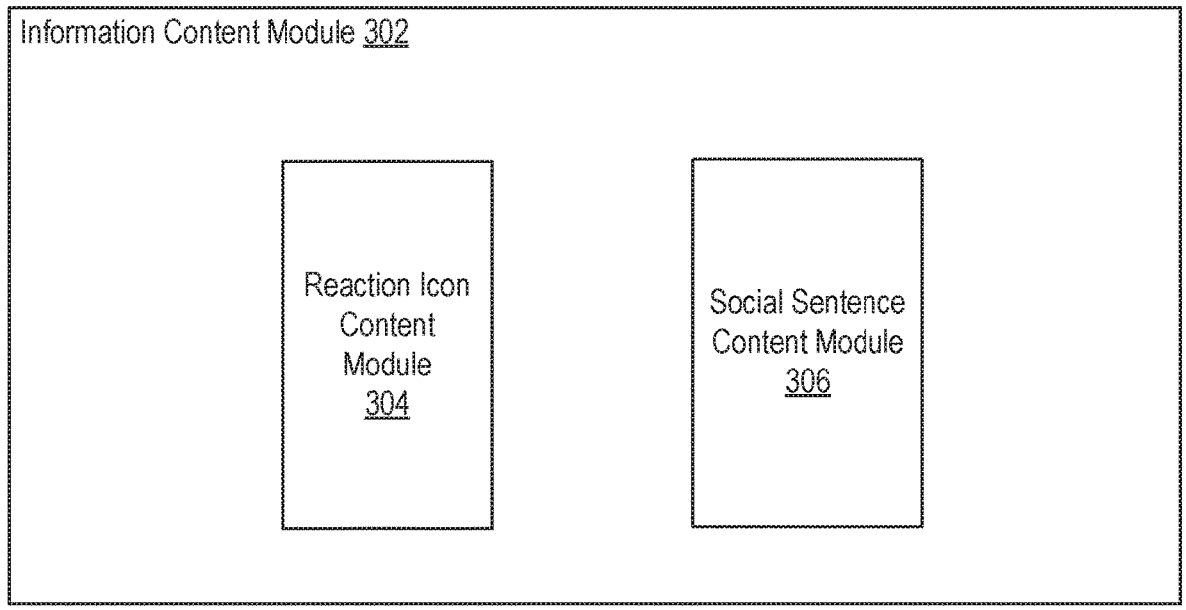
FIG. 3 illustrates an example information content module, according to an embodiment of the present disclosure.

FIG. 3 illustrates an example information content module 302 configured to determine user interaction information to be presented to a user, according to an embodiment of the present disclosure. In some embodiments, the information content module 106 of FIG. 1 can be implemented as the example information content module 302. As shown in FIG. 3, the information content module 302 can include a reaction icon content module 304 and a social sentence content module 306.

The reaction icon content module 304 can be configured to determine one or more reaction icons to be presented to a user. In certain embodiments, users may be given the ability to react to a social network content post by selecting a reaction icon from a set of predefined reaction icons. For example, users can select a "like" icon indicating that they like the social network content post, or a "love" icon indicating that they love the social network content post, or a "haha" icon indicating that they find the social network content post funny, or a "sad" icon indicating that they find the social network content post sad, or an "angry" icon indicating that the social network content post makes them angry. As users react to the social network content post by selecting various reaction icons, one or more reaction icons can be presented in a user reaction information area (such as the user reaction information area 204 of FIG. 2A) to indicate to a current user how other users have reacted to a social network content post.

In certain embodiments, one or more reaction icons are selected for presentation based on a set of information content rules. For example, if users have reacted to a social network content post in only one way, e.g., everyone who has reacted to the social network content post has selected the "like" reaction, then it may be as straightforward as presenting that one reaction icon in the user interaction information area. However, if users have reacted in multiple ways, a subset of the selected reaction icons may be selected for presentation. For example, the set of information content rules may specify a maximum number of reaction icons that can be presented. If users have selected more than the maximum number of reaction icons that can be presented, then a subset of the selected reaction icons must be selected for presentation. In certain embodiments, the subset of the selected reaction icons may be selected based on a ranking and ranking threshold for the set of selected reaction icons. For example, the set of information content rules may dictate that only three reaction icons can be presented. If users have reacted to a social network content post in five different ways, the set of information content rules may dictate that the reaction icons are ranked based on popularity (i.e., the number of users who have selected each reaction icon), and the three most popular reactions are selected for presentation in the user interaction information area. If fewer than three reaction icons have been chosen by users, e.g., all users have selected with the "like" icon or the "love" icon, then all selected reaction icons can be presented.

The social sentence content module 306 can be configured to generate a social sentence to be presented to a user. The social sentence can be a textual representation of user reactions to a social network content post. The social sentence can be indicative of the number of people who have reacted to the social network content post and/or who has reacted to the social network content post. The set of information content rules can dictate how the social sentence is constructed based on various scenarios. For example, the social sentence may be constructed differently depending on whether or not a current user is the first person to react to a social network content post, and/or how many of the current user's connections on a social networking system have reacted to the social network content post. For example, consider a scenario in which a current user, User A, is viewing a social network content post. If none of User A's connections on the social networking system have reacted to the social network content post, the social sentence may simply be a number indicative of how many users have reacted to the social network content post (e.g., "232" if 232 users have reacted).

However, if User A has one or more connections on a social networking system who have reacted to the social network content post, the social network content post may identify one or more of those connections who have reacted. In various embodiments, the set of information content rules may define a maximum number of names that can be presented in the social sentence. If User A has greater than zero connections who have reacted to the social network content post, but below the maximum number specified by the set of information content rules, then each of User A's connections' names may be listed along with an indication of the total number of users who have reacted. For example, if the maximum number of connections' names that can be presented is two, and User A has only one connection that has reacted to the social network content post, then the social sentence can read, "James Doe & 34 others," indicating that User A's social network connection, James Doe, has reacted to the social network content post, along with 34 other users.

If User A has greater than the maximum number of connections that has reacted to a social network content post, e.g., more than two connections who have reacted to the social network content post, then a subset of User A's connections that have reacted can be selected. For example, if the maximum number of connections' names that can be presented in the social sentence is two names, and User A has twenty connections that have reacted to the social network content post, then two connections of the twenty connections can be selected for inclusion in the social sentence. In certain embodiments, a subset of connections that have reacted can be selected based on a ranking and a ranking threshold. For example, User A's connections can be ranked based on a friendship coefficient (or friendship coefficient score) indicative of the affinity between two users, and the top connections can be selected for inclusion in the social sentence. For example, the top two of User A's connections who have reacted to a social network content post can be selected based on their friendship coefficient with respect to User A. The social sentence may read "John Doe, James Doe, and 20 others," where John Doe and James Doe are the two connections who have reacted to the social network content post who have the highest friendship coefficient relative to User A.

In certain embodiments, if a user has a long name (e.g., such that the social sentence cannot satisfy a maximum character threshold if the full name is included), the user's last name can be abbreviated, or dropped altogether. If the first name alone still cannot satisfy a length threshold or maximum character threshold, then the next user in the ranking can be selected. For example, if all of the current user's connections who have reacted to a social network content post are ranked based on friendship coefficient, the next highest connection based on friendship coefficient ranking can be selected. This process can continue until the required number of names are found. However, if there are no names that satisfy the maximum character threshold, then the social sentence can revert back to a default social sentence. For example, the default social sentence can be a numerical count of the total number of reactors (e.g., "38" if there are thirty-eight users who have reacted to the social network content post.)

In certain embodiments, if a current user (e.g., User A) reacts to the social network content post, the social sentence may be updated to indicate the current user's reaction. For example, if a social sentence currently reads "James Doe and 34 others," indicating that User A's connection James Doe and 34 other users have currently reacted, and then User A reacts to the social network content post, the social sentence can be updated to read "You, James Doe, and 34 others." In certain embodiments, if the current user is the first user to react, then the social sentence may include the current user's name, rather than "You." For example, if current user User A is the first user to react to a social network content post, the social sentence could read "User A."

As was described above with respect to the set of information arrangement rules, the set of information content rules may vary based on a state of a social network content post. As discussed above, a social network content post may have a collapsed state and an expanded state. A collapsed state may have less room for reaction information in the user interaction information area. The collapsed state may have different information content rules than a social network content post in an expanded state. For example, the collapsed state may only allow for inclusion of one name in the social sentence, rather than two.

In certain embodiments, if the current user reacts to a social network content post, identification of the current user (e.g., "You") may count as a name to be included in the social sentence. For example, if two names can be included in the social sentence, and the current user has not reacted to the social network content post, then the names of two connections who have reacted may be presented (e.g., the social sentence may read "James Doe, John Doe, and 33 others."). However, once the current user reacts to the social network content post, one of the two connections' names may be replaced by identification of the current user (e.g., the social sentence may now read "You, James Doe, and 34 others.").

Figure 4:
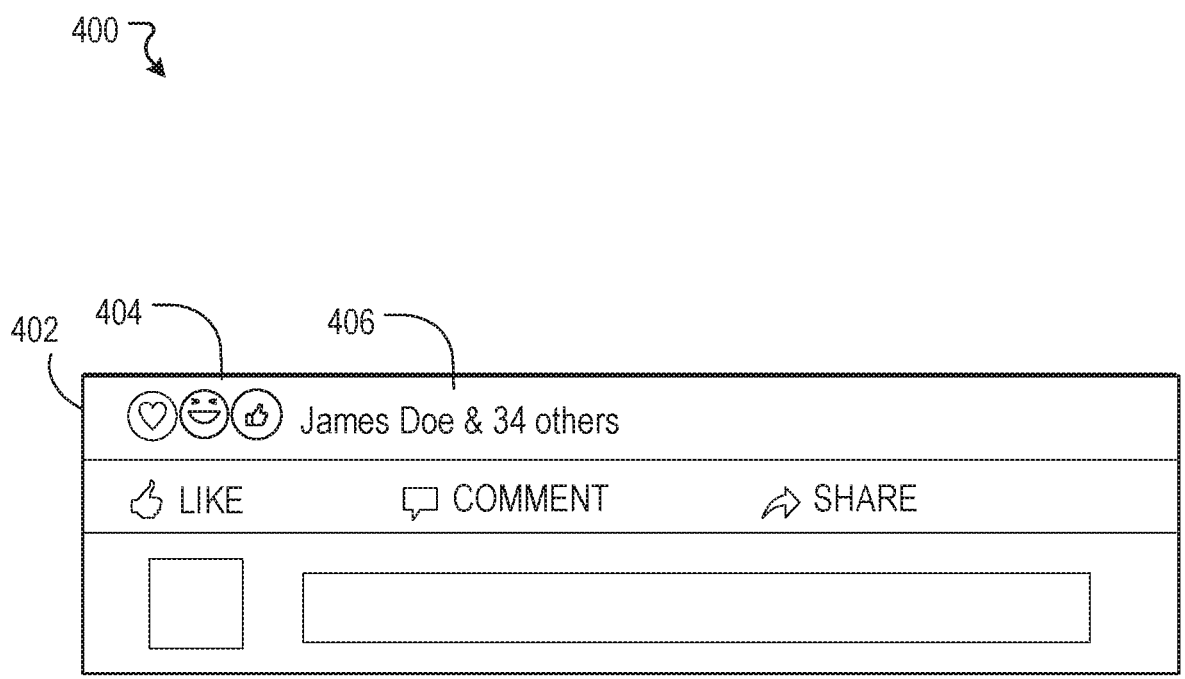
FIG. 4 illustrates an example scenario including an example user interaction information presentation interface, according to an embodiment of the present disclosure.

FIG. 4 presents an example scenario 400 displayed in a user interface in which information content rules can be implemented to determine user interaction information to be presented to a user. The example scenario 400 includes a user interaction information area 402. The user interaction information area 402 includes one or more reaction icons 404 (in this case, there are three reaction icons), and a social sentence 406. The user interaction information area 402 and the information contained therein are indicative of user interaction with an associated social network content post (not shown). In the example shown, the reaction icons 404 indicate that users have reacted to the social network content post in at least three different ways (love, haha, and like), and the social sentence 406 indicates that 35 users have reacted to the social network content post, including a user named James Doe. As discussed above, the content in the user interaction information area 402, including the content of the reaction icons 404 and the social sentence 406, can be determined based on a set of information content rules.

As discussed above, in certain embodiments, the reaction icons 404 may have been selected based on various reaction icon ranking criteria. For example, the 35 users who have reacted to the social network content post may have selected five or six different reaction icons, but the top three most popular reaction icons are displayed in the user interaction information area 402. The reaction icons 404 may be displayed in order of popularity, such that the "love" icon was selected by the most users, the "haha" icon was selected by the second most users, and the "like" icon was selected by the third most users.

In certain embodiments, hovering over a particular reaction icon will present a list of users who have selected that reaction icon. Clicking a particular reaction icon can open up a pop-up window of users who have selected that reaction icon. Hovering over the social sentence can present a list of all users who have reacted to the social network content post, and clicking on the social sentence can present a pop-up window listing all users who have reacted to the social network content post. In various embodiments, the pop-up window may present tabs, each tab associated with either a particular reaction icon or representing a collection of all users who have reacted to the social network content post. These tabs can allow the current user to select the various tabs to see a list of users who have selected each reaction icon or to see a complete list of all users who have reacted to the social network content post. In certain embodiments, connections of the current user may be listed ahead of other users who are not connections of the current user.

As also discussed above, the content of the social sentence may vary and/or be updated based on who has reacted to the social network content post and/or how many users have reacted to the social network content post. For example, if User A is the current user in example scenario 400, the name of user "James Doe" may be displayed because James Doe is a connection of User A on a social networking system. It may be the case that other connections of User A have reacted to the social network content post. However, the names of the other connections may not be displayed due to a maximum name threshold defining the maximum number of names that may be displayed in the social sentence 406. A subset of connection names can be selected based on one or more information content rules. The information content rules may define ranking criteria for ranking and selecting a subset of connection names to be displayed in the social sentence 406. For example, James Doe may have been selected for display in the social sentence 406 based on a friendship coefficient ranking in which all of User A's connections who have reacted to the social network content post are ranked based on a friendship coefficient score with respect to User A. It may also be a possibility that James Doe did not have the highest friendship coefficient score, but had the highest friendship coefficient score among connections who had a name that satisfied a maximum character threshold defined by the information content rules.

Figure 5:
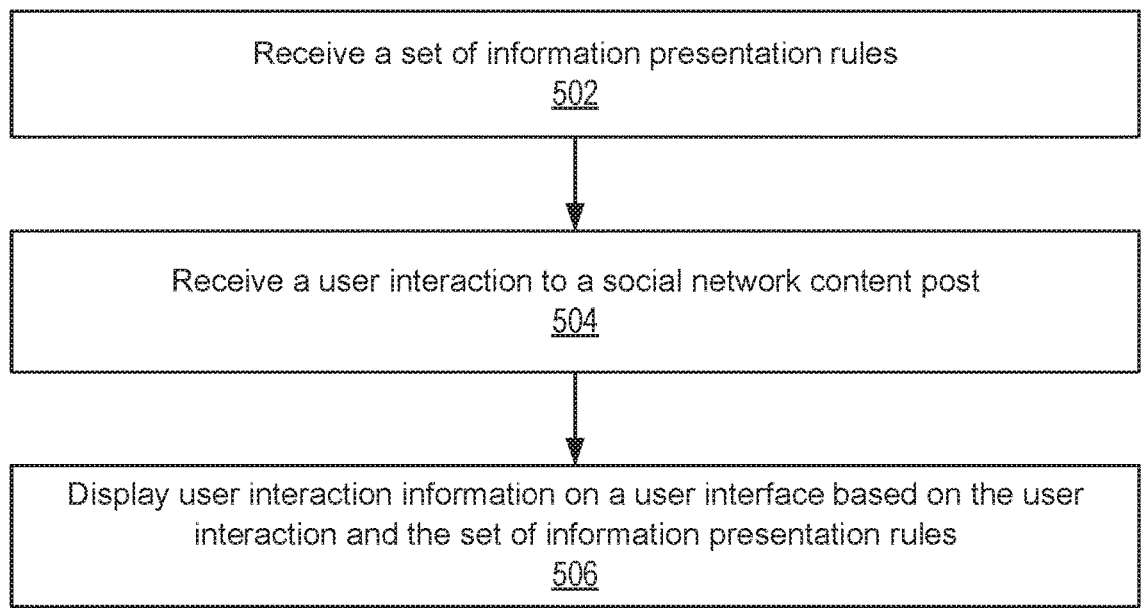
FIG. 5 illustrates an example method associated with presenting user interaction information, according to an embodiment of the present disclosure.

FIG. 5 illustrates an example method 500 associated with displaying user interaction information, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can receive a set of information presentation rules. At block 504, the example method 500 can receive a user interaction to a social network content post. At block 506, the example method 500 can display user interaction information on a user interface based on the user interaction and the set of information presentation rules. Other suitable techniques that incorporate various features and embodiments of the present technology are possible.

FIG. 6 illustrates an example method 600 associated with presenting user reaction information, according to an embodiment of the present disclosure. It should be appreciated that there can be additional, fewer, or alternative steps performed in similar or alternative orders, or in parallel, based on the various features and embodiments discussed herein unless otherwise stated.

At block 602, the example method 600 can receive a set of information presentation rules, including a set of information arrangement rules and a set of information content rules. At block 604, the example method 600 can receive a plurality of reactions to a social network content post, each of the plurality of reactions associated with a particular reaction icon selected from a predefined plurality of reaction icons. At block 606, the example method 600 can, rank the plurality of reaction icons based on reaction icon ranking criteria, the reaction icon ranking criteria defined by the set of information content rules. At block 608, the example method 600 can, select one or more reaction icons for presentation based on the ranking the plurality of reaction icons. At block 610, the example method 600 can determine an order of presentation for the one or more reaction icons based on the set of information arrangement rules. At block 612, the example method 600 can generate a social sentence based on the set of information content rules and the plurality of reactions. Other suitable techniques that incorporate various features and embodiments of the present technology are possible.

Social Networking System—Example Implementation

Figure 7:
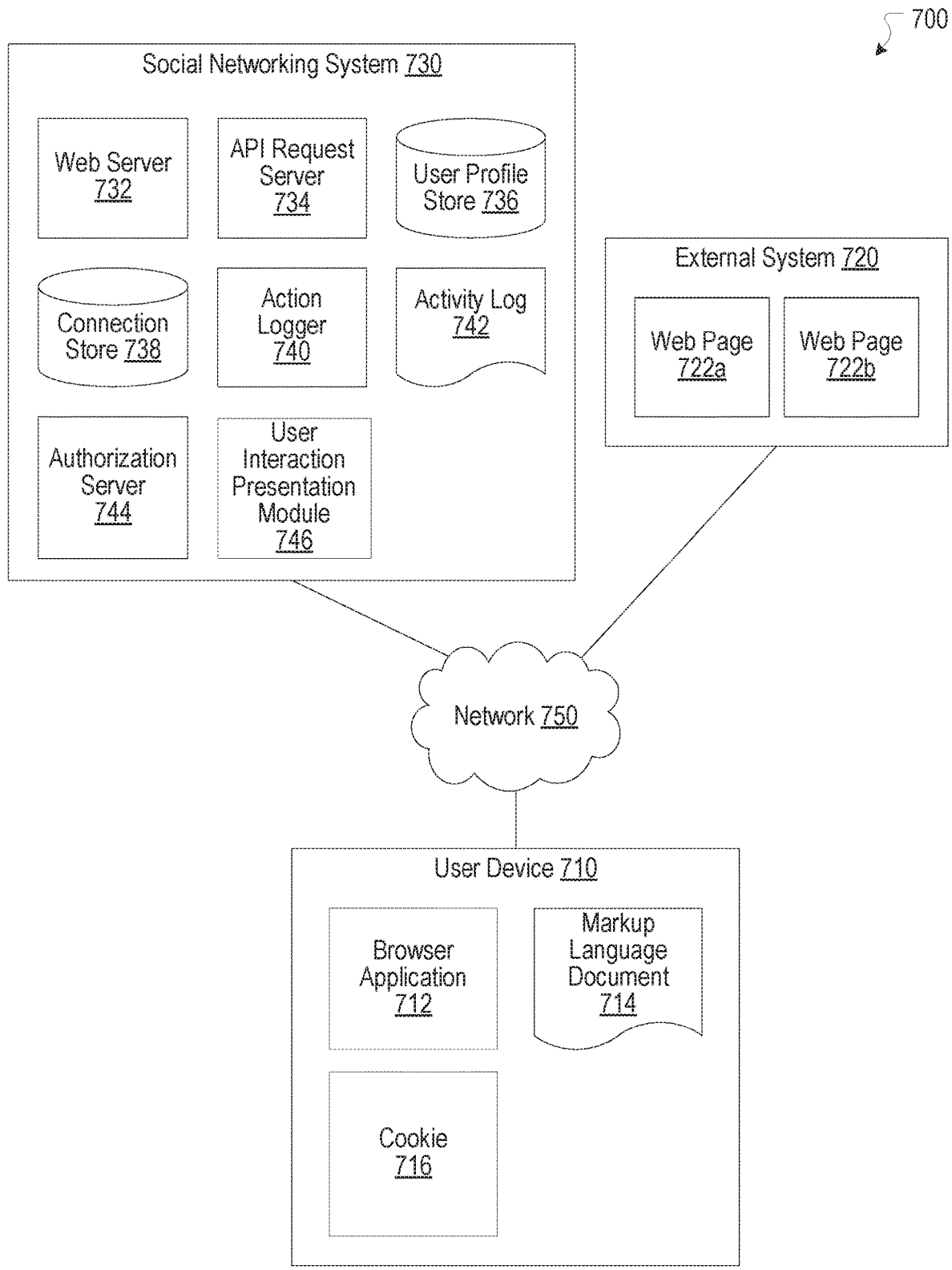
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user may be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This can occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a user interaction presentation module 746. The user interaction presentation module 746 can, for example, be implemented as the user interaction presentation module 102 of FIG. 1. As discussed previously, it should be appreciated that there can be many variations or other possibilities. For example, in some instances, the user interaction presentation module 746 (or at least a portion thereof) can be included or implemented in the user device 710. Other features of the user interaction presentation module 746 are discussed herein in connection with the user interaction presentation module 102.

Hardware Implementation

Figure 8:
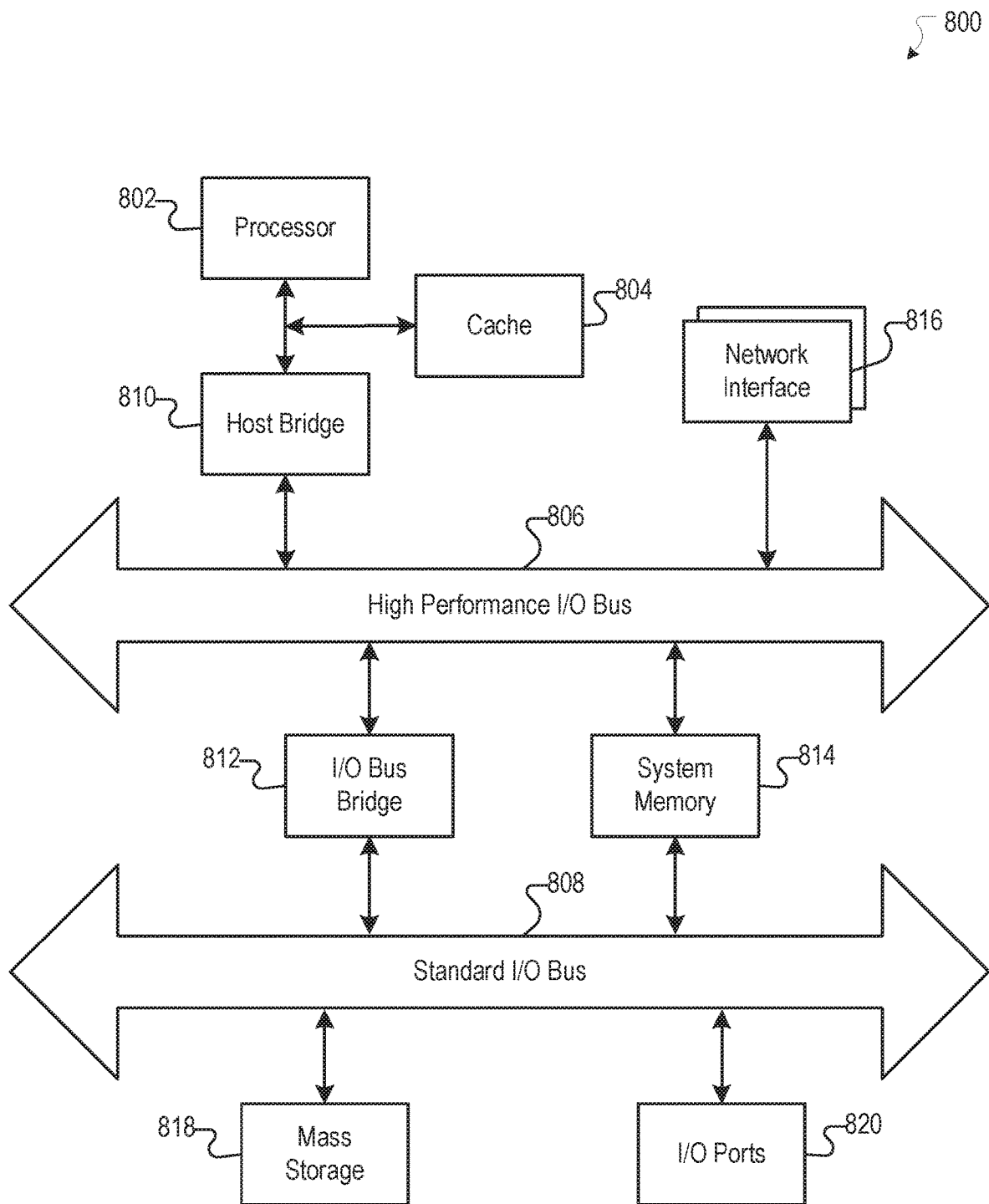
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    providing, by a computing system, a first user with a plurality of predefined reaction icons for interacting with a content post, each reaction icon being indicative of a respective reaction to the content post;
    receiving, by the computing system, a first user interaction from the first user to the content post, wherein the first user interaction is one user interaction among a plurality of user interactions to the content post from a plurality of users;
    ranking, by the computing system, the plurality of predefined reaction icons based on the plurality of user interactions to the content post;
    determining, by the computing system, a subset of the plurality of predefined reaction icons based on the ranking the plurality of predefined reaction icons, the subset having a number of predefined reaction icons that satisfies a threshold number of predefined reaction icons; and
    providing, by the computing system, the first user with user interaction information for the content post on a user interface, wherein the user interaction information comprises at least the subset of the plurality of predefined reaction icons presented in a particular order based on the ranking the plurality of predefined reaction icons.

2. The computer-implemented method of claim 1, wherein the particular order for presenting the subset of the plurality of predefined reaction icons is determined based on how many users of the plurality of users have selected each reaction icon in response to the content post.

3. The computer-implemented method of claim 1, further comprising:
    generating a social sentence based on the plurality of user interactions, wherein the social sentence is a textual representation of user interaction with the content post and is indicative of how many users have reacted to the content post using the plurality of predefined reaction icons.

4. The computer-implemented method of claim 3, further comprising:
    updating the social sentence in response to receiving the first user interaction from the first user to indicate that the first user has interacted with the content post.

5. The computer-implemented method of claim 3, wherein a set of users that have reacted to the content post using the plurality of predefined reaction icons defines a set of reacting users, and the generating the social sentence comprises:
 determining that the set of reacting users does not include any connections of the first user on a social networking system; and
 generating a social sentence based on the determination that the set of reacting users does not include any connections of the first user on the social networking system.

6. The computer-implemented method of claim 5, wherein the generating the social sentence based on the determination that the set of reacting users does not include any connections of the first user on the social networking system comprises:
 generating a social sentence that is indicative of how many users have reacted to the content post using the plurality of predefined reaction icons without identifying any individual user of the set of reacting users.

7. The computer-implemented method of claim 3, wherein a set of users that have reacted to the content post using the plurality of predefined reaction icons defines a set of reacting users, and the generating the social sentence comprises:
 determining that the set of reacting users includes one or more connections of the first user on a social networking system; and
 generating a social sentence based on the determination that the set of reacting users includes one or more connections of the first user on the social networking system.

8. The computer-implemented method of claim 7, wherein the generating the social sentence based on the determination that the set of reacting users includes one or more connections of the first user on the social networking system comprises:
 generating a social sentence that is indicative of how many users have reacted to the content post using the plurality of predefined reaction icons and that identifies at least some of the one or more connections of the first user on the social networking system that are included in the set of reacting users.

9. The computer-implemented method of claim 8, wherein a set of information presentation rules define a maximum number of user names capable of being identified in the social sentence, and the method further comprises:
 determining a set of connected users from the set of reacting users, the set of connected users comprising a plurality of users, each user in the set of connected users being a connection of the first user on the social networking system;
 determining that the number of users in the set of connected users is greater than the maximum number of user names capable of being identified in the social sentence;
 ranking the set of connected users based on user ranking criteria; and
 selecting a subset of the set of connected users for identification in the social sentence based on the ranking.

10. The computer-implemented method of claim 8, wherein the ranking the set of connected users comprises ranking the set of connected users based on a friendship coefficient indicative of an affinity between the first user and each user in the set of connected users.

11. A system comprising:
 at least one processor; and
 a memory storing instructions that, when executed by the at least one processor, cause the system to perform a method comprising:
 providing a first user with a plurality of predefined reaction icons for interacting with a content post, each reaction icon being indicative of a respective reaction to the content post;
 receiving a first user interaction from the first user to the content post, wherein the first user interaction is one user interaction among a plurality of user interactions to the content post from a plurality of users;
 ranking the plurality of predefined reaction icons based on the plurality of user interactions to the content post;
 determining a subset of the plurality of predefined reaction icons based on the ranking the plurality of predefined reaction icons, the subset having a number of predefined reaction icons that satisfies a threshold number of predefined reaction icons; and
 providing first user with user interaction information for the content post on a user interface, wherein the user interaction information comprises at least the subset of the plurality of predefined reaction icons presented in a particular order based on the ranking the plurality of predefined reaction icons.

12. The system of claim 11, wherein the particular order for presenting the subset of the plurality of predefined reaction icons is determined based on how many users of the plurality of users have selected each reaction icon in response to the content post.

13. The system of claim 11, wherein the instructions further cause the system to perform:
 generating a social sentence based on the plurality of user interactions, wherein the social sentence is a textual representation of user interaction with the content post and is indicative of how many users have reacted to the content post using the plurality of predefined reaction icons.

14. The system of claim 13, wherein the instructions further cause the system to perform:
 updating the social sentence in response to receiving the first user interaction from the first user to indicate that the first user has interacted with the content post.

15. The system of claim 13, wherein a set of users that have reacted to the content post using the plurality of predefined reaction icons defines a set of reacting users, and the generating the social sentence comprises:
 determining that the set of reacting users does not include any connections of the first user on a social networking system; and
 generating a social sentence based on the determination that the set of reacting users does not include any connections of the first user on the social networking system.

16. A non-transitory computer-readable storage medium including instructions that, when executed by at least one processor of a computing system, cause the computing system to perform a method comprising:
 providing a first user with a plurality of predefined reaction icons for interacting with a content post, each reaction icon being indicative of a respective reaction to the content post;
 receiving a first user interaction from the first user to the content post, wherein the first user interaction is one user interaction among a plurality of user interactions to the content post from a plurality of users;

ranking the plurality of predefined reaction icons based on the plurality of user interactions to the content post;

determining a subset of the plurality of predefined reaction icons based on the ranking the plurality of predefined reaction icons, the subset having a number of predefined reaction icons that satisfies a threshold number of predefined reaction icons; and providing first user with user interaction information for the content post on a user interface, wherein the user interaction information comprises at least the subset of the plurality of predefined reaction icons presented in a particular order based on the ranking the plurality of predefined reaction icons.

17. The non-transitory computer-readable storage medium of claim 16, wherein the particular order for presenting the subset of the plurality of predefined reaction icons is determined based on how many users of the plurality of users have selected each reaction icon in response to the content post.

18. The non-transitory computer-readable storage medium of claim 16, wherein the instructions further cause the computing system to perform:

generating a social sentence based on the plurality of user interactions, wherein the social sentence is a textual representation of user interaction with the content post and is indicative of how many users have reacted to the content post using the plurality of predefined reaction icons.

19. The non-transitory computer-readable storage medium of claim 18, wherein the instructions further cause the computing system to perform:

updating the social sentence in response to receiving the first user interaction from the first user to indicate that the first user has interacted with the content post.

20. The non-transitory computer-readable storage medium of claim 18, wherein a set of users that have reacted to the content post using the plurality of predefined reaction icons defines a set of reacting users, and the generating the social sentence comprises:

determining that the set of reacting users does not include any connections of the first user on a social networking system; and generating a social sentence based on the determination that the set of reacting users does not include any connections of the first user on the social networking system.

* * * * *